United States Patent
Fukahori

(10) Patent No.: US 10,700,341 B2
(45) Date of Patent: Jun. 30, 2020

(54) NEGATIVE ELECTRODE FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si, Gyeonggi-do (KR)

(72) Inventor: Hironobu Fukahori, Osaka (JP)

(73) Assignee: Samsung SDI Co., Ltd., Yongin-si (KR)

( * ) Notice: Subject to any disclaimer, the term of this patent is extended or adjusted under 35 U.S.C. 154(b) by 541 days.

(21) Appl. No.: 14/106,705

(22) Filed: Dec. 13, 2013

(65) Prior Publication Data
US 2014/0170484 A1    Jun. 19, 2014

(30) Foreign Application Priority Data

Dec. 19, 2012 (JP) .................................. 2012-277359
Aug. 2, 2013 (KR) ........................ 10-2013-0092106

(51) Int. Cl.
*H01M 4/66* (2006.01)
*H01M 4/13* (2010.01)
(Continued)

(52) U.S. Cl.
CPC ............. *H01M 4/13* (2013.01); *H01M 4/139* (2013.01); *H01M 4/364* (2013.01); *H01M 4/366* (2013.01);
(Continued)

(58) Field of Classification Search
CPC .. H01M 4/666; H01M 4/1393; H01M 4/0404; H01M 4/583; H01M 4/0471;
(Continued)

(56) References Cited

U.S. PATENT DOCUMENTS

2006/0099505 A1   5/2006   Fujino et al.
2006/0166098 A1   7/2006   Tabuchi et al.
(Continued)

FOREIGN PATENT DOCUMENTS

CN   1706054 A    12/2005
CN   102770991 A   11/2012
(Continued)

OTHER PUBLICATIONS

Patent Abstracts of Japan and Machine English Translation of JP 2002-042787 A, 9 pages.
(Continued)

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

A negative electrode for a rechargeable lithium battery including a current collector and a negative active material layer positioned on the current collector, wherein the negative active material layer includes a first active material including a carbon-based material, a composite material including a second active material including a silicon-based material or a tin-based material, the second active material being coated with a combined binder and a fiber-shaped conductive material on the surface thereof, and a binder, a rechargeable lithium battery including the same and a method of preparing the same.

14 Claims, 4 Drawing Sheets

(51) Int. Cl.
*H01M 4/36* (2006.01)
*H01M 4/139* (2010.01)
*H01M 4/62* (2006.01)
*H01M 4/587* (2010.01)
*H01M 4/48* (2010.01)
*H01M 4/04* (2006.01)
*H01M 4/583* (2010.01)
*H01M 4/1393* (2010.01)

(52) U.S. Cl.
CPC ........... *H01M 4/483* (2013.01); *H01M 4/587* (2013.01); *H01M 4/625* (2013.01); *H01M 4/0404* (2013.01); *H01M 4/0471* (2013.01); *H01M 4/1393* (2013.01); *H01M 4/48* (2013.01); *H01M 4/583* (2013.01); *H01M 4/666* (2013.01); *Y02E 60/122* (2013.01)

(58) Field of Classification Search
CPC ........ H01M 4/48; H01M 4/139; H01M 4/587; H01M 4/366; H01M 4/364; H01M 4/483; H01M 4/625; H01M 4/13; Y02E 60/122
USPC .......................................... 429/211; 427/122
See application file for complete search history.

(56) References Cited

U.S. PATENT DOCUMENTS

| | | | | |
|---|---|---|---|---|
| 2008/0145757 | A1* | 6/2008 | Mah ...................... | H01M 4/133 429/219 |
| 2008/0241695 | A1* | 10/2008 | Song ..................... | B82Y 30/00 429/231.8 |
| 2010/0243951 | A1* | 9/2010 | Watanabe ............. | H01M 4/485 252/182.1 |
| 2010/0279172 | A1* | 11/2010 | Hwang ................. | H01M 4/131 429/219 |
| 2010/0288970 | A1* | 11/2010 | Watanabe ........... | H01M 4/0428 252/182.1 |
| 2012/0021286 | A1 | 1/2012 | Tabuchi et al. | |
| 2012/0321948 | A1 | 12/2012 | Oya et al. | |

FOREIGN PATENT DOCUMENTS

| | | |
|---|---|---|
| JP | 2002-042787 A | 2/2002 |
| JP | 2004-22367 A | 1/2004 |
| JP | 2004-146292 A | 5/2004 |
| JP | 2004-356078 A | 12/2004 |
| JP | 2008-210618 A | 9/2008 |
| JP | 2011-076741 A | 4/2011 |
| JP | 2012-033440 A | 2/2012 |
| KR | 10-2007-0030487 A | 3/2007 |
| KR | 10-0818263 | 3/2008 |
| KR | 10-2013-0016727 A | 2/2013 |
| WO | WO 2011/105126 A1 | 9/2011 |

OTHER PUBLICATIONS

Patent Abstracts of Japan and Machine English Translation of JP 2004-356078 A, 10 pages.
Patent Abstracts of Japan and Machine English Translation of JP 2008-210618 A, 21 pages.
Patent Abstracts of Japan and Machine English Translation of JP 2011-076741 A, 33 pages.
Patent Abstracts of Japan and Machine English Translation of JP 2012-033440 A, 9 pages.
JPO Office Action dated Oct. 25, 2016, for corresponding Japanese Patent Application No. 2012-277359 (3 pages).
KIPO Office Action dated Nov. 10, 2016, for corresponding Korean Patent Application No. 10-2013-0092106 (4 pages).
SIPO Office Action, with English translation, dated Dec. 29, 2016, for corresponding Chinese Patent Application No. 201310705922.8 (13 pages).
SIPO Office Action, with English translation, dated Dec. 12, 2017, for corresponding Chinese Patent Application No. 201310705922.8 (11 pages).
SIPO Office Action, with English translation, dated Sep. 4, 2017, for corresponding Chinese Patent Application No. 201310705922.8 (11 pages).
Chinese Patent Office Decision of Final Rejection with English Translation for corresponding Chinese Application No. 201310705922. 8, dated Jul. 27, 2018, 10 pages.
Chinese Patent Office Notice of Reexamination with English Translation for corresponding Chinese Application No. 201310705922.8, dated Apr. 1, 2019, 12 pages.
Chinese Patent Office Notification of Reexamination with English Translation for corresponding Chinese Patent Application No. 201310705922.8, dated Jun. 27, 2019, 13 pages.

\* cited by examiner

NEGATIVE ELECTRODE FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of Japanese Patent Application No. 2012-277359, filed in the Japanese Patent Office on Dec. 19, 2012, and Korean Patent Application No. 10-2013-0092106, filed in the Korean Intellectual Property Office on Aug. 2, 2013, the entire contents of both of which are incorporated herein by reference.

BACKGROUND

1. Field

Embodiments of the present invention relate to a negative electrode for a rechargeable lithium battery, a method of preparing the same, and a rechargeable lithium battery including the same.

2. Description of the Related Art

A silicon-based material has been suggested for use as a negative active material of a rechargeable lithium battery. The silicon-based material may improve the discharge capacity of a rechargeable lithium battery when the silicon-based material is used as a negative active material.

However, the silicon-based material may undergo violent expansion and shrinkage during charge and discharge. Specifically, the silicon-based active material expands when charging, and shrinks when discharging. Thus, the binding or conductive networks between silicon-based materials may be interrupted during shrinkage. Therefore, when a silicon-based active material is used as a negative active material, the cycle-life of a rechargeable lithium battery is not sufficient.

SUMMARY

An aspect of an embodiment of the present invention is directed toward a negative electrode for a rechargeable lithium battery that improves cycle-life characteristics of a rechargeable lithium battery.

An aspect of an embodiment of the present invention is directed toward a method of preparing the negative electrode for a rechargeable lithium battery.

An aspect of an embodiment of the present invention is directed toward a rechargeable lithium battery including the negative electrode for a rechargeable lithium battery.

One embodiment of the present invention includes a negative electrode for a rechargeable lithium battery that includes a current collector and a negative active material layer positioned on the current collector, wherein the negative active material layer includes a first active material including a carbon-based material; a composite material including a second active material including a silicon-based material or a tin-based material coated with a combined binder and a fiber-shaped conductive material on the surface thereof; and a binder, the combined binder may be coated in an amount of about 4 wt % to about 20 wt % based on the total amount of the composite material, the fiber-shaped conductive material is coated in an amount of about 1 wt % to about 5 wt % based on the total amount of the composite material, and the binder is included in an amount of about 1 wt % to about 10 wt % based on the total amount of the negative active material layer.

The silicon-based material may include a silicon oxide, a silicon-containing alloy, or a combination thereof.

The tin-based material may include tin, tin oxide, a mixture of a graphite material with tin, a mixture of a graphite material with tin oxide, a mixture of a graphite material with tin and tin oxide, a tin-containing alloy, or a combination thereof.

The second active material may be included in an amount of about 3 wt % to about 80 wt % based on the total amount of the first active material and the second active material.

The fiber-shaped conductive material may include a fiber-shaped carbon.

The fiber-shaped conductive material may include carbon nanotube, a carbon nanofiber, a composite of carbon nanotube and carbon black, a composite of a carbon nanofiber and carbon black, or a combination thereof.

The combined binder may include polyvinylidene fluoride, polyacrylonitrile, polyimide, polyamideimide, polyacrylic acid, a derivative thereof, or a combination thereof.

The binder may include a styrene-butadiene copolymer, carboxylmethyl cellulose, polyvinylidene fluoride, polyacrylate, polyolefin, polyacrylic acid, a derivative thereof, or a combination thereof.

A total content of the combined binder and the binder may be about 1 wt % to about 15 wt % based on the total amount of the negative active material layer.

Another embodiment of the present invention provides a rechargeable lithium battery including the negative electrode.

Yet another embodiment of the present invention provides a method of preparing a negative electrode for a rechargeable lithium battery that includes dispersing a first active material including a carbon-based material, a composite material including a second active material including a silicon-based material or a tin-based material coated with a combined binder and a fiber-shaped conductive material on the surface thereof and a binder, in a solvent, to prepare slurry; and applying the slurry on a current collector to prepare a negative active material layer.

The composite material may be prepared by combining the combined binder, the fiber-shaped conductive material, and the second active material using a mechanochemical method to obtain a composite material; and heat-treating the composite material.

Other embodiments are included in the following detailed description.

Binding or conductive networks between negative active materials may be selectively fortified and therefore cycle-life characteristics of a rechargeable lithium battery may be improved.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Expressions such as "at least one of," when preceding a list of elements, modify the entire list of elements and do not modify the individual elements of the list. Further, the use of "may" when describing embodiments of the present invention refers to "one or more embodiments of the present invention."

Figure 1:
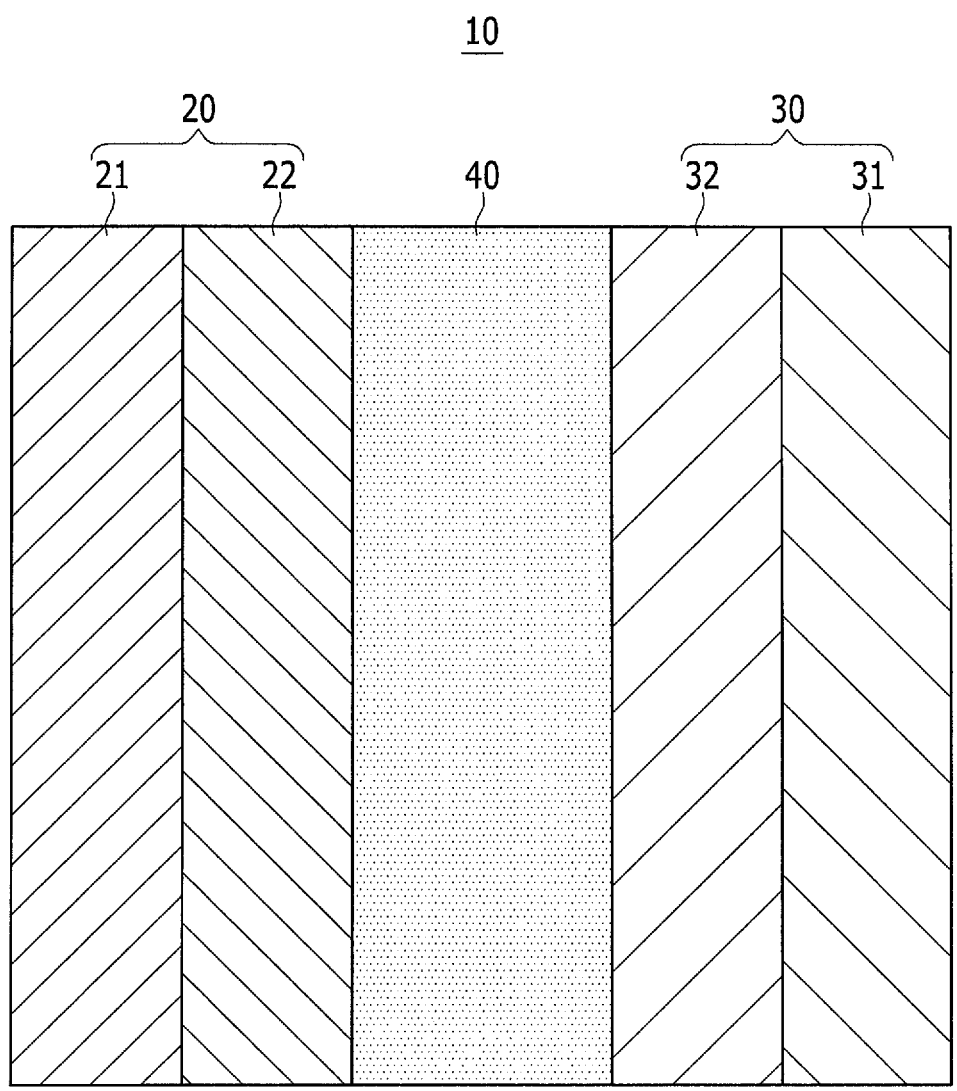

FIG. 1 is a cross-sectional view showing a schematic structure of a rechargeable lithium battery according to one embodiment.

Figure 2:
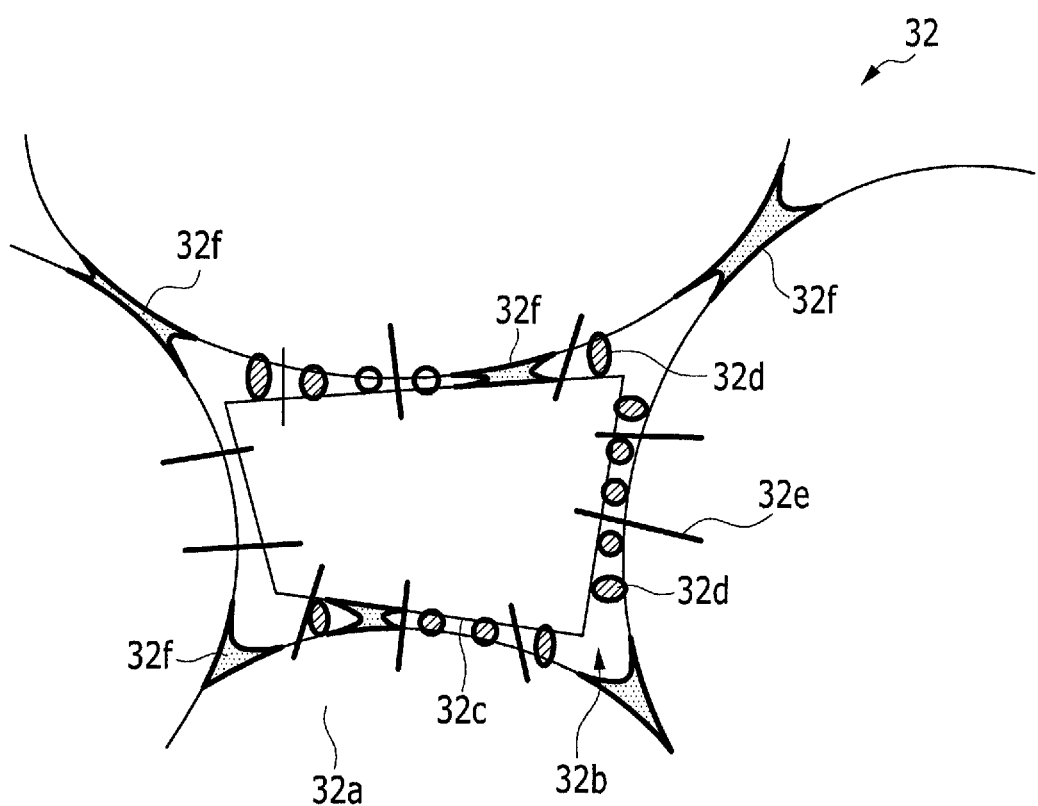

FIG. 2 is a view showing a structure of a negative electrode for a rechargeable lithium battery according to one embodiment.

Figure 3:
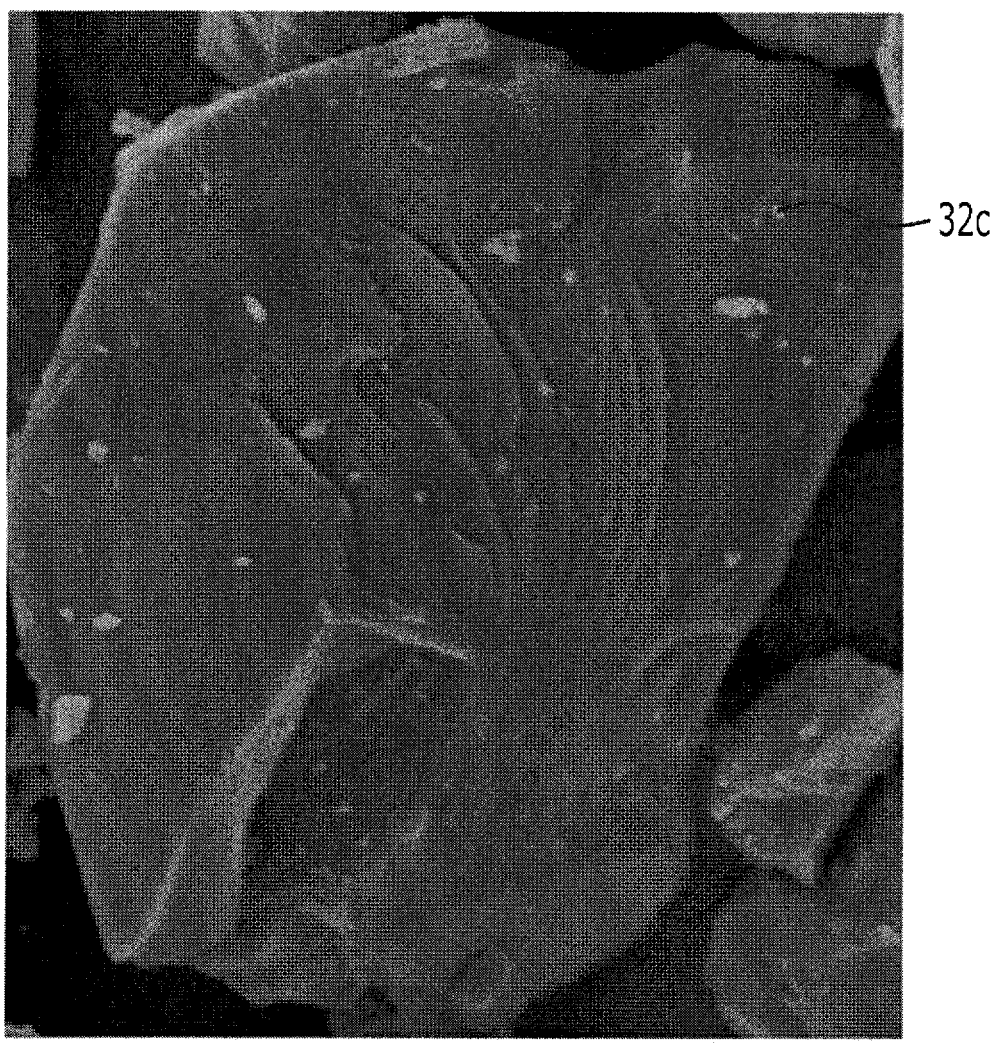

FIG. 3 is a scanning electron microscope (SEM) photograph of a silicon-based material according to one embodiment.

Figure 4:
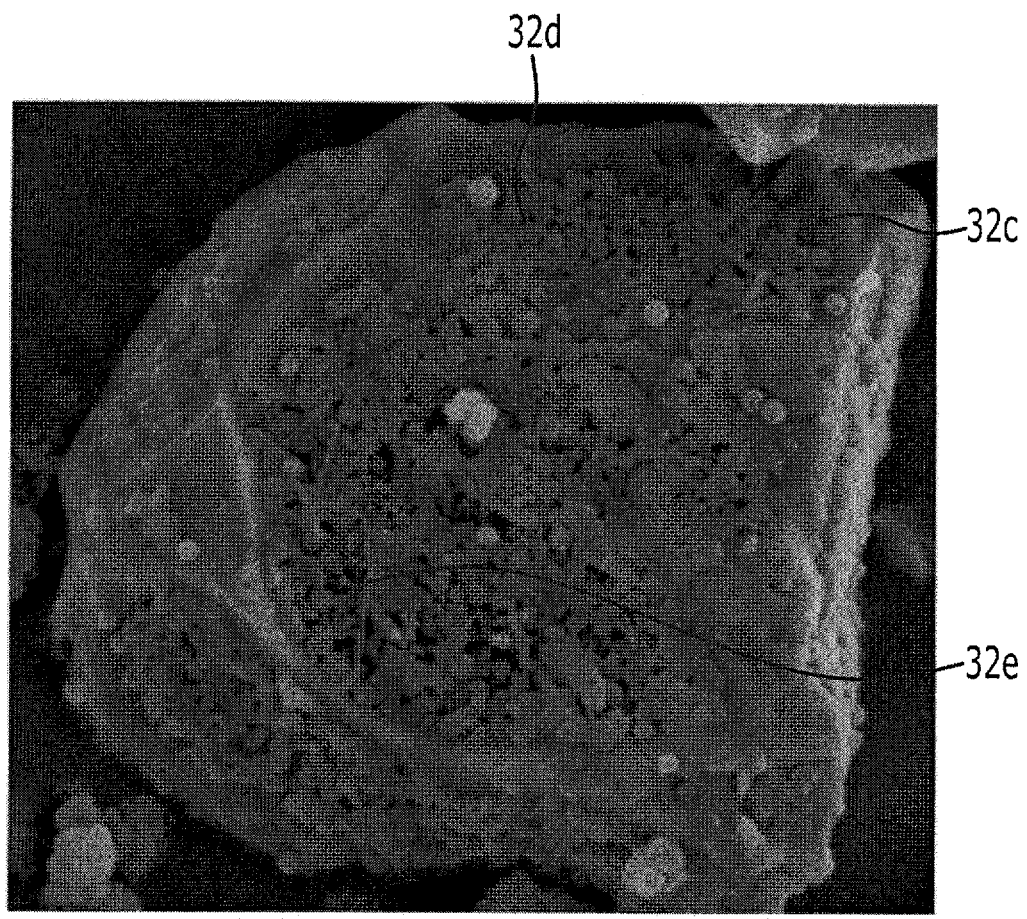

FIG. 4 is a scanning electron microscope (SEM) photograph of a composite material according to one embodiment.

DETAILED DESCRIPTION

Hereinafter, embodiments of the present invention are described in more detail with reference to the accompanying drawings. However, these embodiments are exemplary, and this disclosure is not limited thereto. Here, when a first element is described as being "on" a second element, the first element may be directly on the second element or there may be a third element between the first element and the second element. Further, some of the elements that are not essential to the complete understanding of the invention are omitted for clarity. Also, like reference numerals refer to like elements throughout.

A rechargeable lithium battery according to one embodiment is described referring to FIG. 1.

FIG. 1 is a cross-sectional view showing a schematic structure of a rechargeable lithium battery according to one embodiment.

Referring to FIG. 1, a rechargeable lithium battery 10, according to one embodiment of the present invention includes a positive electrode 20, a negative electrode 30, and a separator 40 interposed between the positive electrode 20 and the negative electrode 30.

A charge cut-off voltage (oxidation reduction potential) (vs. Li/Li+) of the rechargeable lithium battery may be, for example, greater than or equal to about 4.3V and less than or equal to about 5.0V, and more specifically may be greater than or equal to about 4.5V and less than or equal to about 5.0V.

The rechargeable lithium battery has no particular limit about its shape, for example, the rechargeable lithium battery may have a shape such as a cylinder, a prism, a laminated shape, a button-shape, or the like.

The negative electrode 30 may include a current collector 31 and a negative active material layer 32 formed on the current collector 31.

The current collector 31 may be any conductor, and may be, for example, copper, copper alloy, stainless steel, nickel-plated steel, and/or the like.

The negative active material layer 32 is described referring to FIG. 2.

FIG. 2 is a view showing a structure of a negative electrode for a rechargeable lithium battery according to one embodiment of the present invention.

Referring to FIG. 2, the negative active material layer 32 includes a first active material 32a, a composite material 32b including a second active material, and a binder 32f.

The first active material 32a may include a carbon-based material.

The carbon-based material may be anything that is applicable to a negative active material layer of a rechargeable lithium battery. For example, the carbon-based material may be a graphite material such as artificial graphite, natural graphite, a mixture of artificial graphite and natural graphite, a natural graphite coated with artificial graphite, and/or the like.

The composite material 32b may include a second active material 32c, a combined binder 32d, and a fiber-shaped conductive material 32e. Specifically, the composite material 32b may have a structure where the combined binder 32d and fiber-shaped conductive material 32e are coated on the surface of the second active material 32c.

The second active material 32c may include a silicon-based material or a tin-based material.

The silicon-based material may be, for example, silicon oxide, a silicon-containing alloy, or a combination thereof.

The silicon oxide may be, for example, $SiO_x$ ($0.5 \leq x \leq 1.5$); a composite material including $SiO_x$ ($0.5 \leq x \leq 1.5$) core and a carbon coating layer coated on the surface of the core; or a combination thereof. The $SiO_x$ ($0.5 \leq x \leq 1.5$) may have a structure where an ultrafine particle of silicon is dispersed in silicon dioxide ($SiO_2$).

The silicon-containing alloy may be an alloy represented by, for example, X—Si (wherein X is at least one of Ni, Fe, Co, Cu, Mn, Zn, In, Ag, Ti, Ge, Bi, Sb, and Cr).

The tin-based material may be, for example, tin, tin oxide, a mixture of a graphite material with the foregoing material, a tin-containing alloy, or a combination thereof.

The tin oxide may be, for example, $SnO_y$ ($1.4 \leq y \leq 2.0$), and/or the like.

The tin-containing alloy may be, for example, $Cu_6Sn_5$, $Cu_3Sn$, $MnSn_2$, $FeSn_2$, $NiSn_4$, $Co_3Sn_2$, and/or the like.

The second active material 32c may be included in an amount of about 3 wt % to about 80 wt % based on total amount of the first active material 32a and the second active material 32c. When the content of second active material is within the range, discharge capacity and cycle-life characteristics of a rechargeable lithium battery may be improved.

The combined binder 32d may be coated on the surface of the second active material 32c and specifically, the surface of the particle of the second active material 32c and may be combined therewith. Herein, the term "combined" may refer to, for example physical binding.

The combined binder 32d may bind the second active material 32c with the first active material 32a.

When the combined binder 32d is adjacent to the composite materials 32b therewith, it may bind them with each other.

When the second active material 32c severely expands and shrinks during charge and discharge, the combined binder 32d having high binding properties may be used.

Specifically, the combined binder 32d may be, for example, polyvinylidene fluoride, polyacrylonitrile, polyimide, polyamideimide, polyacrylic acid, a derivative thereof, or a combination thereof.

The combined binder 32d may be coated in an amount of about 4 wt % to about 20 wt % and specifically about 4 wt % to about 15 wt % based on the total amount of the composite material 32b. When the combined binder is coated within the range, discharge capacity and cycle-life characteristics of a rechargeable lithium battery may be improved.

The fiber-shaped conductive material 32e may be combined with the surface of the second active material 32c, and specifically the surface of the particle of the second active material 32c.

The fiber-shaped conductive material 32e contacts the first active material 32a, and facilitates the exchange of electrons between the first active material 32a and the second active material 32c. That is, the fiber-shaped conductive material 32e may form a conductive network between the first active material 32a and the second active material 32c. The fiber-shaped conductive material 32e may maintain a conductive network because it may contact the first active material 32a during shrinkage of the second active material 32c. Accordingly, a rechargeable lithium battery according to one embodiment has improved discharge capacity and cycle-life characteristics.

The fiber-shaped conductive material 32e may include, specifically a fiber-shaped carbon, and more specifically carbon nanotube, a carbon nanofiber, a composite of carbon nanotube and carbon black, a composite of a carbon nanofiber and carbon black, or a combination thereof. Among them, the composite of carbon nanotube and carbon black has both improved dispersion properties and conductivity.

The fiber-shaped carbon may have an average fiber diameter of about 10 nm to about 150 nm, and an average fiber length of about 5 μm to about 30 μm. When an average fiber diameter and an average fiber length of the fiber-shaped carbon are within the range, dispersion properties and conductivity may be improved.

Herein, the average fiber diameter may be calculated by averaging diameters of vertical sides of the fiber-shaped carbon in a length direction, for example, using about 2,000 times-enlarged to about 50,000 times-enlarged SEM images taken by using an electric field-emission scanning electron microscope (JSM-7500F, JEOL Ltd.). In other words, the average fiber diameter is calculated by taking a few samples from the SEM, measuring the diameters of the samples, and averaging the measurements.

The average fiber length may be obtained by averaging length of each fiber-shaped carbon and may be obtained from the same method as the average fiber diameter.

The fiber-shaped conductive material 32e may be included in an amount of about 1 wt % to about 5 wt %, and specifically about 1 wt % to about 3 wt % based on the total amount of the composite material 32b. When the content of the fiber-shaped conductive material is within the above range, discharge capacity and cycle-life characteristics of a rechargeable lithium battery may be improved.

A method of combining the combined binder 32d and the fiber-shaped conductive material 32e on the surface of the second active material 32c has no particular limit. For example, the combination may be performed in a mechanochemical method of uniformly applying impact force, shear force, and compression force to each particle of the mixed powder. The combination in the mechanochemical method may be performed by using, for example, Nobilta (Hosokawa Micron Co.) and/or the like.

The combination may be performed in wet coating, for example, in tumbling fluidized bed granulating coating method of spraying a precursor solution of the combined binder 32d and the fiber-shaped conductive material 32e into particles of the second active material 32c to apply fluidity thereto.

In addition, the composite material 32b may be heat-treated around a melting point or a cross-linking initiation temperature of the combined binder 32d after the combination. Accordingly, the combined binder 32d and the fiber-shaped conductive material 32e are firmly combined on the surface of the second active material 32c.

FIG. 3 is a scanning electron microscope (SEM) photograph of a silicon-based material according to one embodiment, and FIG. 4 is a scanning electron microscope (SEM) photograph of a composite material according to one embodiment.

Specifically, FIG. 3 is a SEM photograph showing an uncombined second active material 32c and specifically, a silicon-based material. FIG. 4 is a SEM photograph showing a composite material obtained by combining a combined binder and fiber-shaped conductive material on the surface of the silicon-based material.

Referring to FIGS. 3 and 4, a binder 32f is dispersed all over the negative active material layer 32 and at least a first active material 32a therein.

The binder 32f may bind the first active material 32a and the second active material 32c.

The binder 32f may bind the second active material 32c when the second active material 32c is close thereto.

The binder 32f may be any binder that is applicable to a negative active material layer of a rechargeable lithium battery, and may be for example, a styrene-butadiene copolymer, carboxylmethyl cellulose, polyvinylidene fluoride, polyacrylate, polyolefin, polyacrylic acid, a derivative thereof, or a combination thereof. The derivative may be, for example, lithium polyacrylate (PAA-Li), and/or the like.

The binder 32f may be included in an amount of about 1 wt % to about 10 wt %, and specifically about 1 wt % to about 8 wt % based on the total amount of the negative active material layer. When the content of the binder is within the above range, discharge capacity and cycle-life characteristics of a rechargeable lithium battery may be improved.

A total content of the combined binder 32d and the binder 32f may be about 1 wt % to about 15 wt % based on the total amount of the negative active material layer 32. When the total content of the combined binder and the binder is within the above range, internal resistance of a battery may be decreased and thus discharge capacity and cycle-life characteristics of a rechargeable lithium battery may be improved.

When the first active material 32a does not severely expand nor shrink during charge and discharge, a conductive network between the first active material 32a may be maintained. Accordingly, the binder 32f need not be disposed on the surface of the first active material 32a. On the other hand, a lot of the binder 32f needs to be on the surface of the second active material 32c since the second active material severely expands and shrinks during charge and discharge, but according to one embodiment, an amount of the binder 32f may decrease because the combined binder 32d is combined on the second active material 32c. Therefore, in one embodiment, binding properties between the second active material 32c and the first active material 32a may be selectively fortified. Accordingly, the total amount of the binder 32f and the combined binder 32d may be decreased.

The negative active material layer 32 may further include a conductive material for an active mass as well as the first active material 32a, the composite material 32b, and the binder 32f.

The conductive material for an active mass may be, for example, carbon black, carbon nanotube, a carbon nanofiber, flake-shaped graphite, graphene, and/or the like.

The conductive material for an active mass may be included in an amount of about 0 wt % to about 3 wt %, specifically about 0.3 wt % to about 1.0 wt % and more specifically about 0.5 wt % to about 1.0 wt % based on the total amount of the negative active material layer 32. Accordingly, the conductive material for an active mass may be included in a small amount in the negative active material layer 32. When the conductive material for an active mass is included in a small amount within the range, a content of a binder 32f need not be increased, resistance increase of a negative electrode and water-solubility decrease of lithium ions during charge may be prevented.

When the first active material 32a does not severely expand nor shrink during charge and discharge, a conductive network between the first active material 32a may be maintained during charging and discharging. Accordingly, the conductive material for an active mass need not be disposed on the surface of the first active material 32a. On the other hand, a lot of the conductive material for an active mass needs to be on the surface of the second active material 32c, since the second active material severely expands and shrinks during charge and discharge, but according to one embodiment, an amount of the conductive material for an active mass may be decreased because the fiber-shaped conductive material 32e is combined on the second active material 32c. Therefore, in one embodiment, binding properties between the second active material 32c and the first active material 32a may be selectively fortified. Accordingly, the total amount of the conductive material for an active mass and the fiber-shaped conductive material 32e may be decreased.

The negative electrode may be prepared as follows.

First, the combined binder, the fiber-shaped conductive material, and the second active material are injected into, for example, Nobilta and combined in a mechanochemical method, and then heat-treated around a melting point or a cross-linking initiating temperature of the combined binder under vacuum, thereby preparing a composite material.

Herein, the heat-treating under vacuum is performed at a melting point of a combined binder having a melting point or at a cross-linking initiating temperature of a combined binder having no melting point (for example, polyimide).

Subsequently, the first active material, the composite material, the binder, and optionally, a conductive material for an active mass are mixed and dispersed into a solvent, for example, water to prepare slurry.

Herein, the solvent used in the slurry may not dissolve the combined binder.

Subsequently, the slurry may be coated on the current collector and dried. Subsequently, the dried sheet is compressed with a roll presser and vacuum-dried around a melting point or a cross-linking initiating temperature of a binder, thereby manufacturing a negative electrode.

Herein, the vacuum-dry may be performed at a melting point of a binder having a melting point or at a cross-linking initiating temperature of a binder having no melting point.

Again with reference to FIG. 1, the negative active material layer 32 may have any thickness without a particular limit, as far as the thickness of the negative active material layer is applicable to a rechargeable lithium battery.

The positive electrode 20 includes a current collector 21 and a positive active material layer 22 positioned on the current collector 21.

The current collector 21 may be any conductor, and may be, for example, aluminum, stainless steel, nickel-plated steel, and/or the like.

The negative active material layer 22 may include a positive active material and a binder.

The positive active material may be, for example, a lithium included solid solution oxide but has no particular limit, as far as a material electrochemically intercalates or deintercalates lithium ions.

The solid solution oxide may be, for example, $Li_aMn_xCo_yNi_zO_2$ ($1.150 \leq a \leq 1.430$, $0.45 \leq x \leq 0.6$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$, $0.10 \leq z \leq 0.3$), $LiMn_{1.5}Ni_{0.5}O_4$, and/or the like.

A content of the positive active material is not particularly limited.

The conductive material may include, for example, carbon black such as ketjen black, acetylene black, and/or the like, a graphite material such as natural graphite, artificial graphite, and/or the like but has no particular limit, as long as it is a suitable material that increases conductivity of a positive electrode.

A content of the conductive material is not particularly limited, and may be used in an amount used in a positive active material layer of a rechargeable lithium battery.

The binder may include, for example, polyvinylidene fluoride, an ethylene-propylene-diene terpolymer, a styrene-butadiene rubber, acrylonitrile-butadiene rubber, a fluoro rubber, polyvinyl acetate, polymethylmethacrylate, polyethylene, nitrocellulose, and/or the like, but has no particular limit as long as it is a suitable material that binds the positive active material and the conductive material on the current collector 21.

A content of the binder is not particularly limited, but may be in an applicable content to a positive active material layer of in a rechargeable lithium battery.

A thickness of the positive active material layer 22 is not particularly limited, and may be any applicable thickness to a positive active material layer of a rechargeable lithium battery.

The positive active material layer 22 may be formed by, for example, dry-mixing the positive active material, the conductive material, and the binder and dispersing them in an organic solvent such as N-methyl-2-pyrrolidone, and/or the like to form slurry, and coating the slurry on the current collector 21 followed by drying and compressing the same.

The coating method has no particular limit but may include, for example, a doctor blade method, a die-coating method, and/or the like.

The separator 40 is not particularly limited, and may be any separator that is usable for a rechargeable lithium battery. Specifically, a porous film or a non-woven fabric having excellent high-rage discharge performance may be used singularly or as a mixture.

A material of the separator may include, for example, a polyolefin-based resin such as polyethylene, polypropylene and/or the like; a polyester-based resin polyethylene terephthalate, polybutylene terephthalate, and/or the like; polyvinylidene fluoride, a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and/or the like.

The separator may be impregnated with an electrolyte.

The electrolyte may not be particularly limited and may be anything that is usable for a rechargeable lithium battery.

Specifically, the electrolyte includes an electrolytic salt dissolved in a non-aqueous solvent.

The non-aqueous solvent may be, for example, cyclic carbonates such as propylene carbonate, ethylene carbonate, butylene carbonate, chloroethylene carbonate, vinylene carbonate, and/or the like; cyclic esters such as γ-butyrolactone, γ-valero lactone, and/or the like; linear carbonates such as dimethyl carbonate, diethyl carbonate, ethylmethyl carbonate, and/or the like; linear esters such as methyl formate, methyl acetate, methyl butyrate, and/or the like; tetrahydrofuran or a derivative thereof; ethers such as 1,3-dioxane, 1,4-dioxane, 1,2-dimethoxy ethane, 1,4-dibutoxyethane, methyl diglyme, and/or the like; nitriles such as acetonitrile, benzonitrile, and/or the like; dioxolane or a derivative thereof; ethylene sulfide, sulfolane, sultone or a derivative thereof, and/or the like. These may be used singularly or in a mixture of two or more.

The electrolytic salt may be, for example, an inorganic ionic salt such as $LiClO_4$, $LiBF_4$, $LiAsF_6$, $LiPF_6$, LiSCN, LiBr, LiI, $Li_2SO_4$, $Li_2B_{10}C_{l1}O$, $NaClO_4$, NaI, NaSCN, NaBr, $KClO_4$, KSCN, and/or the like; an organic ionic salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4Ni$, $C_2H_{54}N$-malate, $C_2H_{54}N$-benzoate, $C_2H_{54}N$-phthalate, lithium stearyl sulfonate, lithium octyl sulfonate, lithium dodecyl benzene sulfonate, and/or the like, and these ionic compounds may be used singularly or in a mixture of two or more.

A concentration of the electrolytic salt is not particularly limited, but may be specifically about 0.1 mol/L to about 5.0 mol/L.

A rechargeable lithium battery may be manufactured as follows.

The separator is disposed between the positive electrode and the negative electrode to manufacture an electrode structure. Subsequently, the electrode structure is processed to have a desired shape, such as, a cylinder, a prism, a laminated shape, a button-shape, and/or the like and then, inserted into the container. Then, the above electrolyte is injected into the container, so that the pore of the separator 40a may be impregnated with the electrolyte.

Hereinafter, the embodiments are illustrated in more detail with reference to examples. These examples, however, should not in any sense be interpreted as limiting the scope of the present invention.

Furthermore, what is not described in this disclosure may be sufficiently understood by those who have knowledge in this field and will not be illustrated here.

Examples 1-1 to 1-7 and Comparative Examples 1-1 to 1-13

Preparation of Composite Material

Silicon oxide (SiO) particles were extracted by mixing and assembling Si powder and $SiO_2$ powder and then heating and cooling the mixture. Subsequently, the silicon oxide particle were ground to have an average particle diameter of 5 μm and heat-treated at 850° C. for 15 minutes under a hydrocarbon gas atmosphere by using a Rotary Kiln, thereby obtaining carbon-coated silicon oxide (SiO).

The carbon-coated silicon oxide (SiO) particles (obtained as a second active material), fiber-shaped carbon (a composite prepared by combining carbon nanotube having an average fiber diameter of 40 nm and an average fiber length of 7 μm with acetylene black to have a specific surface area of 70 m²/g) and a combined binder shown in Table 1 were injected into Nobilta Mini (Hosokawa Micron Co.) in a content ratio provided in Table 1. Subsequently, the Nobilta Mini was operated with a loading power of 500 W for 5 minutes to combine the fiber-shaped carbon and the combined binder on the surface of the carbon-coated silicon oxide particle, obtaining a composite material.

The composite material was prepared by heat-treating a combined binder having a melting point at a melting point temperature or by heat-treating a combined binder having no melting point, that is, polyimide at a cross-linking initiating temperature under vacuum.

Herein, the average particle diameter was obtained by averaging the diameters of all of the spherical shapes when each particle was regarded as a spherical shape. The average particle diameter was measured by using a laser diffraction•scattering particle size analyzer MT3000 (Microtrack Co., Ltd.).

Preparation of Negative Electrode

A negative electrode active mass was prepared by mixing artificial graphite as a first active material, the composite material, and a binder in Table 1 in a ratio provided in the following Table 1. Subsequently, water in an appropriate amount was added to the negative electrode active mass, and the mixture was kneaded and dispersed, preparing slurry. Subsequently, the slurry was coated on one side of an 8 μm-thick current collector made of a copper foil and dried in a thermostat maintained at 80° C. to volatize the water. The dried sheet was compressed with a roll presser.

Subsequently, the compressed sheet was vacuum-dried at a melting point temperature of a binder having a melting point or at a cross-linking initiating temperature of a binder having no melting point, that is, polyimide, thereby obtaining a negative electrode.

The loading amount of the negative electrode active mass was adjusted to reversibly use about 95% of a valid negative active material layer facing with a positive electrode depending on a mixing ratio of the composite material and the artificial graphite.

Preparation of Positive Electrode

Positive electrode active mass was prepared by mixing $LiCoO_2$ having an average particle diameter of 16 μm, acetylene black, and polyvinylidene fluoride (PVdF) in a weight ratio of 96:2:2. Subsequently, N-methyl pyrrolidone (NMP) in an appropriate amount was added to the positive electrode active mass, and the mixture was mixed and dispersed, thereby obtaining a slurry. The slurry was coated on one surface of a 12 μm-thick current collector made of an aluminum foil in a doctor blade method. Subsequently, the coated current collector was dried in a thermostat set at 80° C., while NMP vapor was released. Subsequently, the dried sheet was compressed with a roll presser and vacuum-dried at 100° C., thereby obtaining a positive electrode with a positive active material layer. The positive active material layer was coated to be 80 μm thick.

Preparation of Electrolyte Solution

A $LiPF_6$ solution was prepared by mixing ethylene carbonate (EC) and ethylmethyl carbonate (EMC) in a volume ratio of 3:7 and dissolving $LiPF_6$ to be 1 mole/liter in the mixed solvent. 90 wt % of the $LiPF_6$ solution was mixed with 10 wt % of fluoroethylene carbonate (FEC), thereby preparing an electrolyte solution.

Manufacture of Rechargeable Lithium Battery Cell

The positive and negative electrodes were cut into a set or predetermined size. Subsequently, a 25 μm-thick separator made of a polyolefin-based porous film ND525 (Asahi Kasei E-materials Co.) was interposed between the positive and negative electrodes, thereby manufacturing a flat electrode structure. This flat electrode structure was inserted into a laminate container including a stack of polyethylene-terephthalate (PET) and aluminum, the current collecting tab was taken outside through an opening, and the container was sealed. Subsequently, the electrolyte solution was injected through the opening of the container, and the opening was sealed, thereby manufacturing a rechargeable lithium battery cell.

Activation Treatment of Rechargeable Lithium Battery Cell

The rechargeable lithium battery cell was charged with a constant current/constant voltage of 0.2 C up to a voltage of 4.35V and discharged down to 2.75V with a constant current at 0.2 C, and this charge and discharge cycle was performed one time at room temperature.

Evaluation 1: Cycle-Life Characteristics

The rechargeable lithium battery cells according to Examples 1-1 to 1-7 and Comparative Examples 1-1 to 1-13 were charged with a constant current/constant voltage of 1 C up to 4.35V and discharged with a constant current of 1 C down to 2.75V, and this charge and discharge cycle was repeated 300 times at room temperature. Subsequently, discharge capacity at the 300th cycle was divided by discharge capacity at the 1st cycle to calculate capacity retention. The results are provided in Table 1.

TABLE 1

| | Composite material | | | Negative active material layer | | | |
|---|---|---|---|---|---|---|---|
| | Kinds of combined binder | Content of combined binder (wt %) | Content of fiber-shaped carbon (wt %) | Content of second active material (wt %) | Kinds of binder | Content of binder (wt %) | Total contents of combined binder and binder (wt %) | Capacity retention after 300 cycles (%) |
| Example 1-1 | PVdF | 4 | 1 | 3 | SBR + CMC | 2 | 2.1 | 82 |
| Example 1-2 | PVdF | 4 | 5 | 3 | SBR + CMC | 2 | 2.1 | 82 |
| Example 1-3 | PVdF | 12 | 2 | 3 | SBR + CMC | 2 | 2.4 | 85 |
| Example 1-4 | PVdF | 20 | 1 | 3 | SBR + CMC | 2 | 2.6 | 83 |
| Example 1-5 | PVdF | 20 | 5 | 3 | SBR + CMC | 2 | 2.6 | 84 |
| Example 1-6 | PVdF | 12 | 2 | 3 | PVdF + CMC | 5 | 5.4 | 87 |
| Example 1-7 | PVdF | 12 | 2 | 10 | PVdF + CMC | 5 | 5.2 | 84 |
| Comparative Example 1-1 | — | — | — | 3 | SBR + CMC | 2 | 2.0 | 75 |
| Comparative Example 1-2 | — | — | — | 3 | SBR + CMC | 5 | 5.0 | 64 |
| Comparative Example 1-3 | — | — | — | 3 | SBR + PVdF + CMC | 5 | 5.0 | 78 |
| Comparative Example 1-4 | — | — | — | 3 | PVdF + CMC | 5 | 5.0 | 78 |
| Comparative Example 1-5 | — | — | — | 3 | PVdF + CMC | 12 | 12.0 | 52 |
| Comparative Example 1-6 | PVdF | 4 | 1 | 3 | PVdF + CMC | 12 | 12.1 | 52 |
| Comparative Example 1-7 | PVdF | 4 | — | 3 | SBR + CMC | 2 | 2.0 | 78 |
| Comparative Example 1-8 | PVdF | 4 | 7 | 3 | SBR + CMC | 2 | 2.1 | 79 |
| Comparative Example 1-9 | PVdF | — | 1 | 3 | SBR + CMC | 2 | 2.0 | 77 |
| Comparative Example 1-10 | PVdF | — | 5 | 3 | SBR + CMC | 2 | 2.0 | 78 |
| Comparative Example 1-11 | PVdF | 3 | 1 | 3 | SBR + CMC | 2 | 2.1 | 79 |
| Comparative Example 1-12 | PVdF | 25 | 5 | 3 | SBR + CMC | 2 | 2.8 | 75 |
| Comparative Example 1-13 | — | — | — | 10 | PVdF + CMC | 5 | 5.0 | 69 |

"—" indicates that a content is 0 wt %.
"SBR + CMC" indicates a 1:1 mixture of styrene-butadiene rubber (SBR) and carboxylmethyl cellulose (CMC).
"PVdF + CMC" indicates a mixture of PVdF and CMC in a ratio of 2:1.
"SBR + PVdF + CMC" indicates a 1:2:1 mixture of SBR, PVdF and CMC.

The contents (wt %) of a combined binder and fiber-shaped carbon are respectively based on the total weight of each composite material.

The content (wt %) of a second active material is based on the total weight of the second active materials.

The content (wt %) of a binder and the total content (wt %) of the combined binder and the binder are respectively based on the total weight of each negative active material layer.

Referring to Table 1, the rechargeable lithium battery cells according to Examples 1-1 to 1-7 showed higher capacity retention than the rechargeable lithium battery cells according to Comparative Examples 1-1 to 1-13 and excellent cycle-life characteristics.

Examples 2-1 to 2-7 and Comparative Examples 2-1 to 2-6

A rechargeable lithium battery cell was manufactured according to the same method as Example 1-1 except for changing the kind and content of a combined binder, the content of a second active material, the content of fiber-shaped carbon, and the kind and content of a binder as provided in Table 2.

Evaluation 2: Cycle-Life Characteristics

Cycle-life characteristics of the rechargeable lithium battery cell were evaluated in the same method as Evaluation 1 except for changing the number of charge and discharge cycles to 100 times. The results are provided in Table 2.

The content (wt %) of a combined binder, the content (wt %) of fiber-shaped carbon, the content (wt %) of a second active material, the content (wt %) of a binder, and the total weight of the combined binder and the binder (wt %) are respectively provided in Table 1.

Referring to Table 2, the rechargeable lithium battery cells according to Examples 2-1 to 2-7 showed higher capacity retention than the rechargeable lithium battery cells according to Comparative Examples 2-1 to 2-6 and also, excellent cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

TABLE 2

|  | Composite material | | | Negative active material layer | | | |
| --- | --- | --- | --- | --- | --- | --- | --- |
|  | Kinds of combined binder | Content of combined binder (wt %) | Content of fiber-shaped carbon (wt %) | Content of second active material (wt %) | Kinds of binder | Content of binder (wt %) | Total content of combined binder and a binder (wt %) | Capacity retention after 100 cycles (%) |
| Example 2-1 | PVdF | 12 | 2 | 50 | PVdF + CMC | 5 | 11.0 | 93 |
| Example 2-2 | PVdF | 4 | 1 | 80 | PVdF + CMC | 10 | 13.2 | 88 |
| Example 2-3 | PVdF | 4 | 5 | 80 | PVdF + CMC | 10 | 13.2 | 88 |
| Example 2-4 | PVdF | 12 | 2 | 80 | PVdF + CMC | 5 | 14.6 | 90 |
| Example 2-5 | PVdF | 12 | 2 | 80 | PAA-Li | 5 | 14.6 | 91 |
| Example 2-6 | PAN | 12 | 2 | 80 | PAA-Li | 5 | 14.6 | 92 |
| Example 2-7 | PI | 12 | 2 | 80 | PAA-Li | 5 | 14.6 | 93 |
| Comparative Example 2-1 | — | — | — | 80 | PAA-Li | 10 | 10.0 | 60 |
| Comparative Example 2-2 | — | — | — | 80 | PI | 10 | 10.0 | 80 |
| Comparative Example 2-3 | PVdF | 12 | — | 80 | PAA-Li | 5 | 14.6 | 83 |
| Comparative Example 2-4 | PVdF | 12 | 7 | 80 | PAA-Li | 5 | 14.6 | 83 |
| Comparative Example 2-5 | PVdF | — | 1 | 0 | PAA-Li | 10 | 10.0 | 75 |
| Comparative Example 2-6 | PVdF | — | 5 | 0 | PAA-Li | 10 | 10.0 | 77 |

"—" indicates that a content is 0 wt %.
"PAN" indicates polyacrylonitrile.
"PI" indicates polyimide.
"PVdF + CMC" is the same as in the Table 1.

What is claimed is:

1. A negative electrode for a rechargeable lithium battery, comprising
a current collector and a negative active material layer positioned on the current collector,
wherein the negative active material layer comprises:
a first active material comprising a carbon-based material;
a composite material comprising a second active material comprising a silicon-based material or a tin-based material, the second active material being coated with a combined binder and a fiber-shaped conductive material on a surface thereof; and
a binder,
wherein the combined binder is coated in an amount of about 12 wt % to about 20 wt % based on a total amount of the composite material,
wherein the fiber-shaped conductive material is coated in an amount of about 1 wt % to about 5 wt % based on the total amount of the composite material, and
wherein the binder is included in an amount of about 1 wt % to about 5 wt % based on a total amount of the negative active material layer.

2. The negative electrode for the rechargeable lithium battery of claim 1, wherein the silicon-based material comprises silicon oxide, a silicon-containing alloy, or a combination thereof.

3. The negative electrode for the rechargeable lithium battery of claim 1, wherein the tin-based material is selected from the group consisting of tin, tin oxide, a mixture of a graphite material with tin, a mixture of a graphite material with tin oxide, a mixture of a graphite material with tin and tin oxide, a tin-containing alloy, and combinations thereof.

4. The negative electrode for the rechargeable lithium battery of claim 1, wherein the second active material is included in an amount of about 3 wt % to about 80 wt % based on the total amount of the first active material and the second active material.

5. The negative electrode for the rechargeable lithium battery of claim 1, wherein the fiber-shaped conductive material is a fiber-shaped carbon.

6. The negative electrode for the rechargeable lithium battery of claim 5, wherein the fiber-shaped conductive material is selected from the group consisting of carbon nanotube, a carbon nanofiber, a composite of carbon nanotube and carbon black, a composite of a carbon nanofiber and carbon black, and combinations thereof.

7. The negative electrode for the rechargeable lithium battery of claim 1, wherein the combined binder is selected from the group consisting of polyvinylidene fluoride, polyacrylonitrile, polyimide, polyamideimide, polyacrylic acid, derivatives thereof, and combinations thereof.

8. The negative electrode for the rechargeable lithium battery of claim 1, wherein the binder is selected from the group consisting of a styrene-butadiene copolymer, carboxylmethyl cellulose, polyvinylidene fluoride, polyacrylate, polyolefin, polyacrylic acid, derivatives thereof, and combinations thereof.

9. The negative electrode for the rechargeable lithium battery of claim 1, wherein a total content of the combined binder and the binder is about 1 wt % to about 15 wt % based on the total amount of the negative active material layer.

10. A rechargeable lithium battery, comprising the negative electrode according to claim 1.

11. The negative electrode for the rechargeable lithium battery of claim 1, wherein the fiber-shaped conductive material has an average fiber diameter of about 10 nm to about 150 nm and an average fiber length of about 5 μm to about 30 μm.

12. A method of preparing a negative electrode for a rechargeable lithium battery the method, comprising
dispersing a first active material comprising a carbon-based material, a composite material comprising a second active material comprising a silicon-based material or a tin-based material, the second active material being coated with a combined binder and a fiber-shaped conductive material on a surface thereof, and a binder, in a solvent, to obtain a slurry; and
applying the slurry on a current collector to prepare a negative active material layer,
wherein the combined binder is coated in an amount of about 12 wt % to about 20 wt % based on a total amount of the composite material,
wherein the fiber-shaped conductive material is coated in an amount of about 1 wt % to about 5 wt % based on the total amount of the composite material, and
wherein the binder is included in an amount of about 1 wt % to about 5 wt % based on a total amount of the negative active material layer.

13. The method of claim 12, wherein the composite material is prepared by combining the combined binder, the fiber-shaped conductive material, and the second active material using a mechanochemical method to obtain the composite material; and
heat-treating the composite material.

14. The method of claim 12, wherein the fiber-shaped conductive material has an average fiber diameter of about 10 nm to about 150 nm and an average fiber length of about 5 μm to about 30 μm.

* * * * *